United States Patent [19]
Tanimoto et al.

[11] Patent Number: 5,018,671
[45] Date of Patent: May 28, 1991

[54] PROCESS FOR THE CONTINUOUS GRANULATION OF HIGH DENSITY DETERGENT GRANULES

[75] Inventors: Hitoshi Tanimoto; Koichiro Motono; Takuo Goto, all of Wakayama, Japan

[73] Assignee: Kao Corporation, Tokyo, Japan

[21] Appl. No.: 488,835

[22] Filed: Mar. 6, 1990

[30] Foreign Application Priority Data

Mar. 6, 1989 [JP] Japan .................................. 1-53540

[51] Int. Cl.$^5$ ............................................ B02C 23/18
[52] U.S. Cl. ....................................... 241/16; 241/20; 241/21
[58] Field of Search ............ 241/15, 16, 46.17, 46.06, 241/46.11, 65, 20, 21

[56] References Cited

U.S. PATENT DOCUMENTS

| 3,713,594 | 1/1973 | Blakley et al. | 241/46.17 X |
| 3,913,847 | 10/1975 | Glatt et al. | 241/46.17 X |
| 4,111,371 | 9/1978 | Melliger . | |
| 4,511,093 | 4/1985 | Ohkoshi et al. | 241/101 B X |
| 4,623,098 | 11/1986 | Motoyama et al. | |

FOREIGN PATENT DOCUMENTS

| 0323659 | 7/1989 | European Pat. Off. . |
| 2285117 | 4/1976 | France . |
| 2405091 | 5/1979 | France . |
| 2534488 | 4/1984 | France . |
| 1407985 | 10/1975 | United Kingdom . |
| 2019297 | 10/1979 | United Kingdom . |
| 2100610 | 1/1983 | United Kingdom . |

Primary Examiner—Timothy V. Eley
Attorney, Agent, or Firm—Sughrue, Mion, Zinn, Macpeak & Seas

[57] ABSTRACT

A process and apparatus are described for the continuous granulation of high-density detergent granules of a predetermined size from a detergent powder, with the granulation apparatus comprising a granulation chamber, a feeding port located at the top of the granulation chamber, a first discharging port located at the bottom of the granulation chamber including valve means for opening and closing the port, a second discharging port located at the side wall of the granulation chamber, one or more horizontally rotating stirring blades attached to a rotational shaft positioned at the bottom of the granulation chamber which stir and mix the detergent powder, and one or more vertically rotating grinding blades located above the one or more stirring blades and attached to a rotational shaft positioned at the side wall of the granulation chamber which grind and classify coarse detergent particles; and the process comprising the steps of continuously feeding a detergent powder into the granulation chamber, granulating the detergent powder by stirring and mixing the powder with the one or more horizontally rotating stirring blades, and continuously discharging the high-density detergent granules thus formed through the second discharging port.

8 Claims, 11 Drawing Sheets

PROCESS FOR THE CONTINUOUS GRANULATION OF HIGH DENSITY DETERGENT GRANULES

FIELD OF THE INVENTION

This invention relates to a process for the granulation of high-density detergent granules, having an apparent specific gravity of at least 0.5 g/cm$^3$ and a high flowability, as well as an apparatus therefor.

BACKGROUND OF THE INVENTION

Powdery detergents have been widely applied to domestic use. Powdery detergents are highly flowable, hardly cake, form little dust, are easy to handle and are highly soluble. Most of these detergents are produced through spray drying.

Recently, the demand for high-density detergent granules has increased, since these detergents conserve resources. Furthermore, high-density detergents are handy to carry, which makes them convenient for consumers.

However detergent granules produced by spray drying generally have an apparent specific gravity of 0.4 g/cm$^3$ or less and an average particle size of 200 to 1000 μm. Therefore it is difficult to directly produce high-density detergent granules by a conventional spray drying method.

Typical methods for the production of high-density detergent granules as described above include those disclosed in JP-A-61-69897 and JP-A-61-76597, JP-B-58-44120 and JP-A-61-76598. (The term "JP-A" as used herein means a "published unexamined Japanese patent application" and the term "JP-B" as used herein means a "published examined Japanese patent publication").

Namely, known methods for the production of high-density detergent granules comprise granulating spray-dried detergent particles, as disclosed in JP-A-61-69897; mixing detergent components, solidifying the mixture and grinding the same to thereby obtain detergent granules, as disclosed in JP-A-61-76597; or granulating a high-density detergent by using a turntable, as disclosed in JP-B-58-44120 and JP-A-61-76598.

JP-A-61-69897 discloses a batchwise method for the production of highly flowable high-density detergent granules which comprises mixing components in a vertical reaction tank having stirring blades attached to a vertical axis. In this method, however, additional batch reactors are required to accommodate an increase in production capacity.

JP-A-61-76597 discloses a method for the production of a high-density detergent powder which comprises mixing detergent components in a kneader, solidifying the mixture and then grinding the same. However this method is disadvantageous in that the moisture content of the starting materials is limited such that the grinding operation consumes a large amount of electrical power.

Furthermore, JP-B-58-44120 discloses the use of a turntable having a rough surface. In this case, however, a large amount of detergent granules adhere to the rough surface of the turntable. Furthermore, JP-A-61-76598 discloses a method wherein a smooth turntable is used to reduce the amount of detergent granules adhering to the turntable. However this method is still disadvantageous in that a sufficient rotational power required for the granulation of the detergent granules cannot be obtained since detergent granules slip on the surface of the turntable, such that the rotary speed of the turntable must be increased. As a result, the detergent granules are subjected to high temperatures for a prolonged period of time.

SUMMARY OF THE INVENTION

An object of the present invention is to provide a process for the continuous granulation of high-density detergent granules, to thereby continuously obtain highly dispersible and highly soluble detergent granules while reducing space and energy requirements, as well as an apparatus therefor.

The above-noted object of the present invention has been achieved by providing a process for the continuous granulation of high-density detergent granules of a predetermined size from a detergent powder in a granulation apparatus comprising a granulation chamber, a feeding port located at the top of the granulation chamber, a first discharging port located at the bottom of the granulation chamber including valve means for opening and closing the port, a second discharging port located at the side wall of the granulation chamber, one or more horizontally rotating stirring blades attached to a rotational shaft positioned at the bottom of the granulation chamber which stir and mix the detergent powder, and one or more vertically rotating grinding blades located above the one or more stirring blades and attached to a rotational shaft positioned at the side wall of the granulation chamber which grind and classify coarse detergent particles, comprising the steps of continuously feeding a detergent powder into the granulation chamber; granulating the detergent powder by stirring and mixing the powder with the one or more horizontally rotating stirring blade; and continuously discharging the high-density detergent granules thus formed through the second discharging port.

The present invention further provides an apparatus for the continuous granulation of high-density detergent granules of a predetermined size from a detergent powder, comprising: a granulation chamber; a feeding port located at the top of the granulation chamber; a first discharging port located at the bottom of the granulation chamber; a second discharging port located at the side wall of the granulation chamber; one or more horizontally rotating stirring blades attached to a rotational shaft positioned at the bottom of the granulation chamber which stir and mix the detergent powder; and one or more vertically rotating grinding blades located above the one or more stirring blades and attached to a rotational shaft positioned at the side wall of the granulation chamber which grind and classify coarse detergent particles.

The continuous granulation apparatus for producing high-density detergent granules of the present invention has a discharging port located at the side wall of the granulation chamber such that the detergent powder overflows when it reaches an amount of from 10 to 80 % of the capacity of the granulation chamber; and in a preferred embodiment has an intermittent on-off discharging port located at the bottom of the granulation chamber, the center of which is positioned 10 to 60 % of the radius apart from the center of the bottom of the granulation chamber.

BRIEF DESCRIPTION OF THE DRAWINGS

FIG. 2 (b) is a perspective view of the grinding blade, in accordance with the invention. In these figures, granulation chamber 1; feeding port 1B; discharging port 1C; stirring blades 2; and grinding blades 3, are shown.

DETAILED DESCRIPTION OF THE INVENTION

According to the present invention, a detergent powder continuously fed into a granulation chamber is granulated by stirring and mixing with stirring blades, to thereby provide detergent granules, while coarse particles are ground into smaller particles and classified by grinding blades. The high-density detergent granules thus obtained are then continuously discharged from a discharging port located at the side of the granulation chamber, and then fed to a subsequent processing step.

Figure 1:
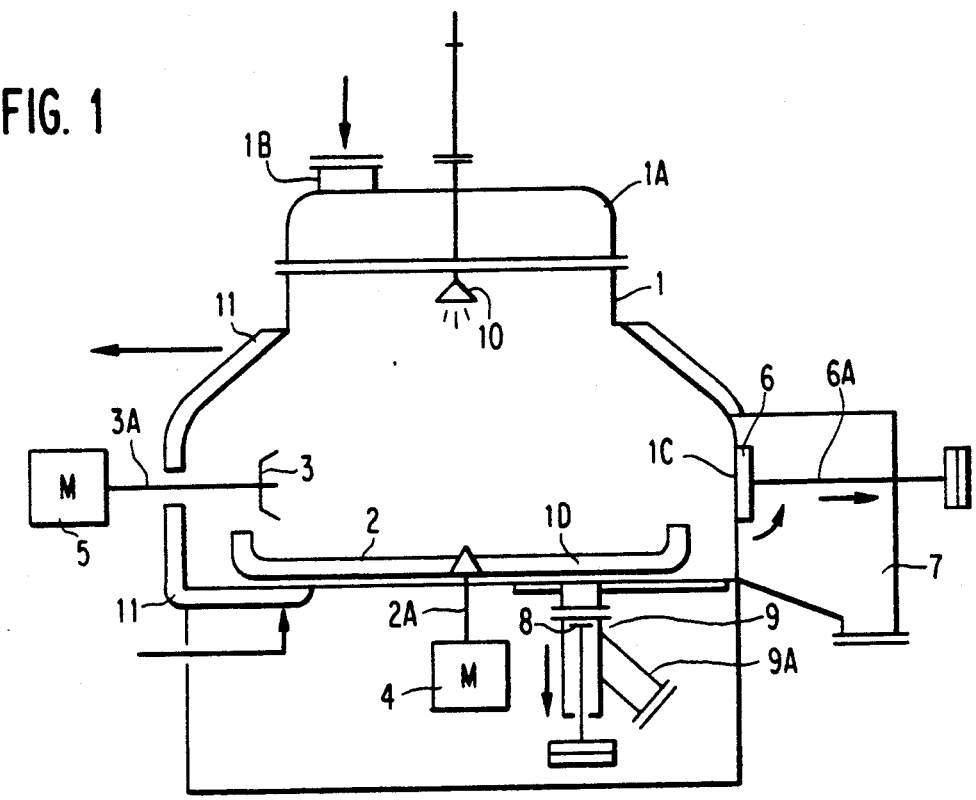
FIG. 1 is a sectional view of an embodiment of the continuous granulation apparatus for producing high-density detergent granules of the present invention.

The process of the present invention is described in reference to the apparatus of FIG. 1, in accordance with the present invention. FIG. 1 is a sectional view of an apparatus of the present invention for the continuous granulation of high-density detergent granules.

Figure 2A:
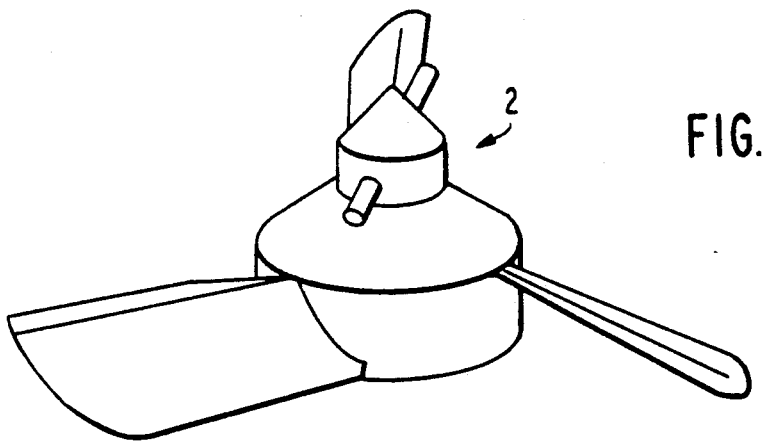
FIG. 2 (a) is a perspective view of the turning blades.
Figure 2B:
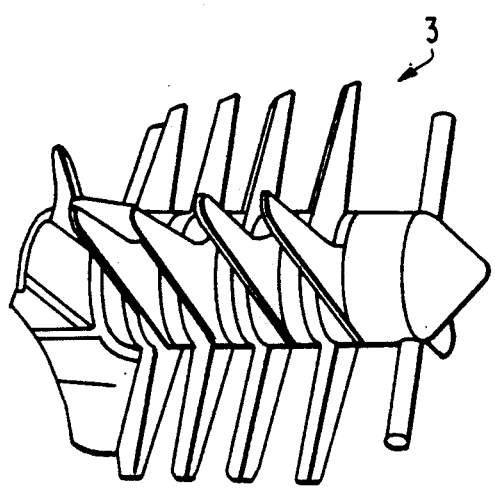

First, an example of the apparatus of the present invention suitable for carrying out the process of the present invention, is illustrated in reference to FIGS. 1 and 2.

As shown in FIG. 1, the apparatus comprises a granulation chamber 1 wherein the detergent powder is granulated to provide granules of a predetermined particle size; horizontally rotating stirring blades 2 attached to a rotational shaft located at the bottom of the granulation chamber 1, which rotate to granulate the detergent powder fed to the granulation chamber 1 by stirring and mixing; and vertically rotating grinding blades 3 located above the stirring blades 2 and attached to a rotational shaft positioned at the side wall of the granulation chamber 1, which rotate to grind the relatively large detergent granules into smaller particles. The stirring blades 2 and grinding blades 3 are respectively connected to motors 4 and 5 via rotational shaft axes 2A and 3A.

Furthermore, a removable lid 1A is provided on the top of the granulation chamber 1 and the detergent powder and a surface improver are continuously fed through a feeding port 1B located in the lid 1A. On the other hand, discharging ports 1C and 1D for discharging detergent granules are provided at the side wall and at the bottom of the granulation chamber, respectively.

The discharging port 1C located at the side wall is activated by an automatic on-off valve 6. During the granulation step, the ground detergent granules are continuously discharged by turning shaft 6A in the counterclockwise direction shown by an arrow in FIG. 1, to thereby appropriately open the on-off valve 6. In addition, the on-off valve 6 is surrounded by a shoot 7, to thereby feed the continuously discharged detergent granules to the subsequent unit operation.

A discharging tube 9 having an on-off valve 8 is connected to the discharging port 1D located at the bottom of the granulation chamber. The detergent granules may be discharged through the discharging port 9A by appropriately adjusting the on-off valve 8. Furthermore, coarse detergent granules, which are frequently formed in the granulation chamber 1 and retained therein, may be discharged by the stirring blades 2 through the discharging port 1D. Thus, by means of this arrangement, the coarse detergent granules do not inhibit the granulation action of the stirring blades 2.

On the other hand, a binder spray 10 for feeding a binder is attached to the center of the lid 1A in the granulation chamber 1. A binder is fed together with the detergent powder from the binder spray 10 so as to accelerate the granulation of the detergent.

Furthermore, a condenser 11 is provided around the granulation chamber 1. Water at a predetermined temperature is circulated in the condenser to maintain a constant temperature in the granulation chamber 1.

The discharging port 1C of the apparatus is located at the side wall of the granulation chamber 1 such that the detergent powder overflows when it reaches an amount of from 10 to 80 % of the capacity of the granulation chamber 1. When the amount of the detergent powder is smaller than 10 % of the capacity of the granulation chamber, the vigorous mixing makes it difficult to accelerate the granulation. On the contrary, when the amount of the detergent powder exceeds 80 % thereof, insufficient stirring and mixing results in unsatisfactory granulation.

In a preferred embodiment, the center of the discharging port 1D is located at a distance of from 10 to 60 % of the inner radius of the granulation chamber 1 from the center of the granulation chamber 1.

The inner diameters of the discharging ports 1C and 1D may be appropriately selected depending on the properties and particle size of the desired detergent granules and the treating capacity of the granulation apparatus. Generally, the inner diameter of the discharging ports preferably ranges from 25 to 300 mm.

In a preferred embodiment, the stirring blades 2 are in the form of a propeller, as shown in FIG. 2 (a). On the other hand, the grinding blade 3 preferably comprises a plurality of staged radial blades attached in the direction of the rotational shaft axis, as shown in FIG. 2 (b).

The detergent powder introduced from the feeding port 1B may comprise various additives such as surfactants, builders, surface improvers and/or fillers. The detergent powder is fed into the granulation chamber 1 and then stirred and mixed by the rotating blades 2. The detergent particles repeatedly collide with the side wall of the granulation chamber 1. The collision with the side wall together with the presence of the binder accelerate the granulation of the detergent powder. Coarse powders having an excessively large size are ground and classified by the grinding blades 3. During this step, the coarse particles, which tend to be retained at the center of the granulation chamber 1, are discharged by intermittently opening the on-off valve 8 at the bottom of the granulation chamber 1, as described above. Thus, the detergent granules are classified to provide a predetermined particle size in the granulation chamber 1, and then are continuously discharged via the discharging port 1C at the side wall of the granulation chamber 1 and the discharging port 1D at the bottom of the same. The detergent granules thus discharged are then fed to a subsequent step.

When detergent granules are granulated with the apparatus in accordance with the invention, the temperature of the detergent granules in the granulation chamber 1 is preferably maintained at from 20° to 60° C., and more preferably from 25° to 50° C. When the temperature is lower than 20° C., an excessive amount of binder is required. When the temperature exceeds 60° C., the detergent granules tend to adhere, for example, to the side wall of the granulation chamber 1, to thereby result in the formation of coarse particles.

The high-density detergent granules, which are continuously granulated in accordance with the process of the invention, may be fed into an apparatus of the type described above and subjected to the above described stirring and mixing, while concurrently feeding a surface improver to the granulation chamber. The surface improver coats the detergent granules with a fine powder, which further improves the flowability and solidifying properties of the detergent granules.

In the granulation of the detergent granules in accordance with the invention, one or more binders and/or surface improvers may be continuously and simultaneously fed to the granulation chamber. Thus, the granulation properties of the detergent granules may be controlled to thereby conduct the granulation more efficiently, within a shorter period of time, and at a higher yield.

Aluminosilicate, which also serves to bind calcium ion during washing, may be preferably used as the surface improver. Aluminosilicate having an average particle size of primary particles of 10 $\mu$m or less is particularly suitable as the surface improver.

The surface improver is used in an amount of from 1 to 20 parts by weight, and preferably from 3 to 20 parts by weight, per 100 parts by weight of the detergent powder. When the amount of the surface improver is less than one part by weight, it is difficult to obtain detergent granules of a high flowability and excellent solidifying properties. When it exceeds 20 parts by weight, on the other hand, the granulation properties of the detergent powder are excessively deteriorated and the workability of the detergent powder is reduced. Furthermore, the resulting product tends to form dust, which is considered to be undesirable by consumers. The surface improver for use in the present invention preferably has an average particle size of 10 $\mu$m or less.

As the above described binder, a liquid such as water may be employed in order to appropriately bind the detergent particles to each other, such that the resulting detergent particles are in the form of a powder.

The binder is used in an amount of not more than 10 parts by weight per 100 parts by weight of the detergent powder. When the amount of the binder exceeds 10 parts by weight, granulation is excessive, and excessively large granules tend to form. As a result, the solubility of the resulting detergent product is lowered, or the yield is reduced due to the increase in the relative amount of coarse granules that need to be removed.

Examples of the surfactant, surface improver and builder for use in the present invention include those described, for example, in JP-A-61-69897. These surfactants, surface improvers and builders may be further blended with various additives commonly used in the production of high-density detergent granules, including the complexing agents, recontamination inhibitors and/or bleaching agents described in JP-A-61-69897, to thereby provide the desired high-density detergent granules. The detergent powder preferably contains from 10 to 70 % by weight, and more preferably from 25 to 50 % by weight, of a surfactant.

As described above, the apparatus of the present invention provides for the production of uniform and spherical high-density detergent granules which have excellent dispersibility, flowability, solidifying properties and solubility. Furthermore, the detergent powder is continuously granulated by using a single apparatus of the present invention. Furthermore, the apparatus of the present invention is compact, and thus advantageous for saving space and energy.

The present invention is further illustrated with respect to the following non-limiting Examples below.

EXAMPLE 1

(i) Preparation of detergent powder

The following components were kneaded in a kneader (1600-65CVJA-3, type 7; manufactured by Satake Kagaku Kikai Kogyo K.K.) and then ground in a mill (Rotary knife cutter DKAS06 type; manufactured by Hosokawa Micron K.K.) to thereby provide a detergent powder.

| | |
|---|---|
| Sodium straight chain alkylbenzenesulfonate ($C_{10}$–$C_{13}$) | 25 parts by weight |
| Sodium alkylsulfate ($C_{12}$ to $C_{18}$) | 10 parts by weight |
| Nonionic surfactant | 3 parts by weight |
| Soap (alkali salt of higher fatty acid of $C_{16}$–$C_{18}$) | 3 parts by weight |
| Zeolite (4A type) | 20 parts by weight |
| Sodium carbonate | 10 parts by weight |
| Sodium silicate No. 2 | 15 parts by weight |
| Sodium sulfate | 7 parts by weight |

(ii) Granulation of detergent powder

The detergent powder prepared as described in (i) above was fed into the continuous granulation apparatus (capacity: 50 l) of FIG. 1, and continuously granulated therein. The results are shown in Table 1 below.

EXAMPLE 2

(i) Preparation of detergent powder

In this Example, the following components were processed in the same manner as described in Example 1, to thereby provide a detergent powder.

| | |
|---|---|
| Sodium straight chain alkylbenzenesulfonate ($C_{10}$–$C_{13}$) | 30 parts by weight |
| Sodium alkylsulfate ($C_{12}$ to $C_{18}$) | 13 parts by weight |
| Nonionic surfactant | 4 parts by weight |
| Soap (alkali salt of higher fatty acid of $C_{16}$–$C_{18}$) | 4 parts by weight |
| Zeolite (4A type) | 15 parts by weight |
| Sodium carbonate | 8 parts by weight |
| Sodium silicate No. 2 | 15 parts by weight |
| Sodium sulfate | 1 part by weight |

(ii) Granulation of detergent powder

In this Example, the detergent powder prepared in (i) above was fed into the same granulation apparatus as used in Example 1, and continuously stirred therein under the conditions specified in Table 1. Table 1 shows the results. During this treatment, a zeolite powder (4A type, average particle size: 4.2 $\mu$m) was simultaneously fed as a surface improver at a rate of 7 parts by weight per 100 parts by weight of the detergent powder.

EXAMPLE 3

In this Example, a detergent powder of the same composition as described in Example 2 was prepared in the same manner as described in Example 2. Next, the detergent powder was fed into the same granulation apparatus as used in Example 1 and continuously stirred to thereby granulate the detergent powder. During this treatment, 7 parts by weight of a zeolite powder (4A type, average particle size: 4.2 μm) per 100 parts by weight of the detergent powder and 2 parts by weight of water per 100 parts by weight of the detergent powder, were simultaneously fed as a surface improver and a binder respectively.

As shown in Table 1, the granulation is completed within a short period in the cases of Examples 1 to 3. Furthermore, products containing few fine particles having a particle size of 125 μm or less were continuously obtained.

TABLE 1

|  | Example | | |
| --- | --- | --- | --- |
|  | 1 | 2 | 3 |
| Detergent powder: | | | |
| Bulk density (g/cm³) | 0.70 | 0.6 | 0.6 |
| Average particle size (μm) | 450 | 470 | 430 |
| Content of fine particles (≦125 μm; % by wt.) | 12.5 | 10.9 | 12.2 |
| Moisture content (%) | 6.5 | 7.0 | 3.0 |
| Granulation conditions: | | | |
| Rotational speed of stirring blades (m/s) | 9 | 9 | 6 |
| Rotational speed of grinding blades (rpm) | 1800 | 1800 | 1800 |
| Feeding rate of detergent powder (kg/min) | 2.1 | 3.0 | 4.2 |
| Average retention time (min) | 10 | 7 | 5 |
| Material temperature (°C.): | | | |
| inlet | 25 | 25 | 25 |
| outlet | 45 | 40 | 35 |
| Properties of granules: | | | |
| Average particle size (μm) | 570 | 600 | 540 |
| Content of fine particles (≦125 μm; % by wt.) | 2.5 | 0.8 | 1.2 |

According to the process for the continuous granulation of high-density detergent granules and an apparatus therefor of the present invention, high-density detergent granules excellent in dispersibility and solubility are continuously produced in an apparatus requiring a reduced amount of space.

While the invention has been described in detail an with reference to specific embodiments thereof, it will be apparent to one skilled in the art that various changes and modifications can be made therein without departing from the spirit and scope thereof.

What is claimed is:

1. A process for the continuous granulation of high-density detergent granules of a predetermined size from a detergent powder in a granulation apparatus comprising a granulation chamber, a feeding port located at the top of the granulation chamber, a first discharging port located at the bottom of the granulation chamber including valve means for opening and closing the port, a second discharging port located at the side wall of the granulation chamber, one or more horizontally rotating stirring blades attached to a rotational shaft positioned at the bottom of the granulation chamber which stir and mix the detergent powder, and one or more vertically rotating grinding blades located above the one or more stirring blades and attached to a rotational shaft positioned at the side wall of the granulation chamber which grind and classify coarse detergent particles, comprising the steps of continuously feeding a detergent powder into the granulation chamber; granulating the detergent powder by stirring and mixing the powder with the one or more horizontally rotating stirring blades; and continuously discharging the high-density detergent granules thus formed through the second discharging port.

2. A process as in claim 1, further comprising the step of grinding coarse detergent particles into smaller particles with the one or more vertically rotating grinding blades.

3. A process as in claim 1, wherein high-density detergent granules are intermittently discharged from the first discharging port.

4. A process as in claim 1, wherein the high-density detergent granules discharged from the second discharging port have an apparent specific gravity of at least 0.5 g/cm³.

5. A process as in claim 1, further comprising concurrently feeding a surface improver and a binder into the granulation chamber.

6. A process as in claim 5, wherein said surface improver is aluminosilicate and said binder is water.

7. A process as in claim 5, wherein the binder is fed into the granulation chamber in an amount of not more than 10 parts by weight per 100 parts by weight of the detergent powder.

8. A process as in claim 5, wherein the surface improver is fed into the granulation chamber in an amount of from 1 to 20 parts by weight per 100 parts by weight of the detergent powder.

* * * * *